Aug. 22, 1950     W. H. COLBERT ET AL     2,519,546
COLORED MIRROR
Filed Feb. 11, 1946                       5 Sheets-Sheet 1
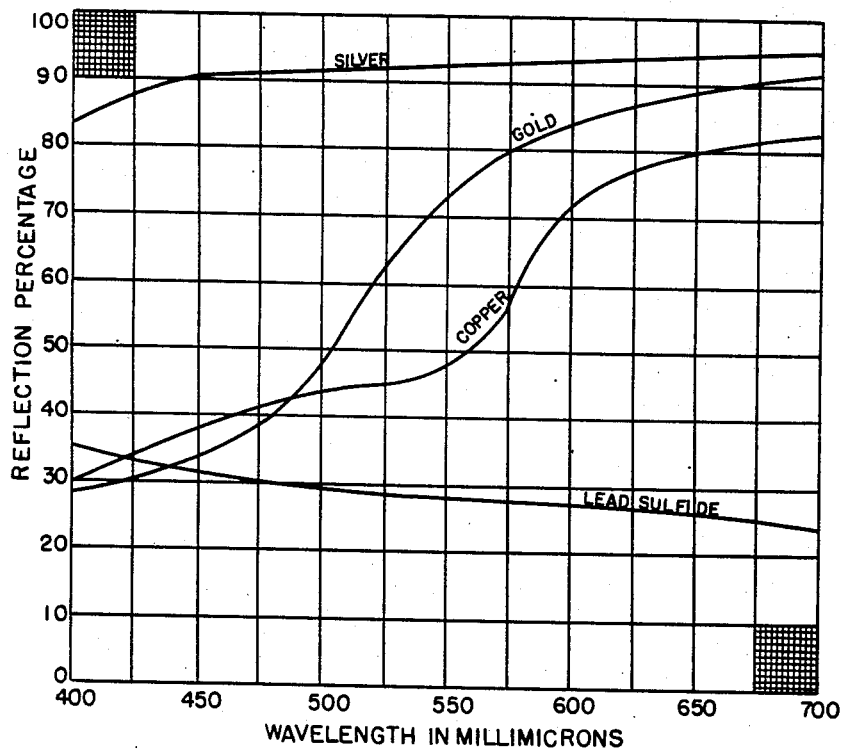
FIG.1.    (PRIOR ART)
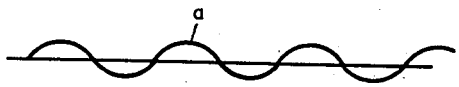
FIG.2.
FIG.3.
FIG.4.
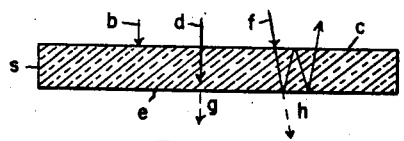
FIG.5.
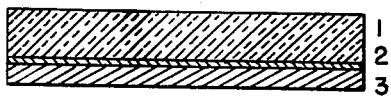
FIG.6.
INVENTORS
WILLIAM H. COLBERT
BY WILLARD L. MORGAN
ATTORNEYS

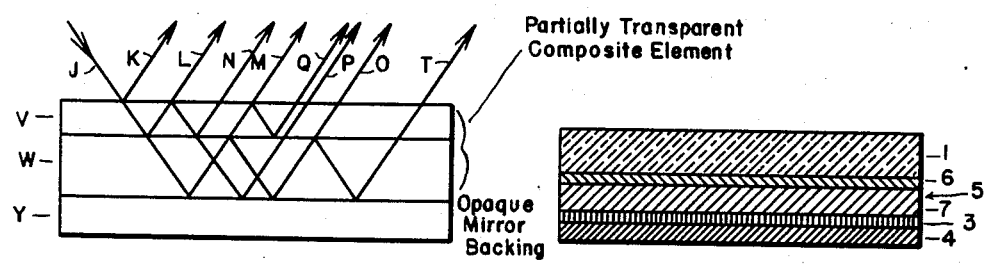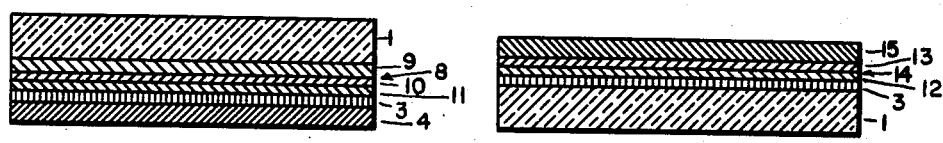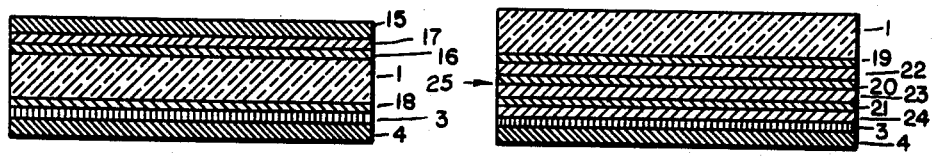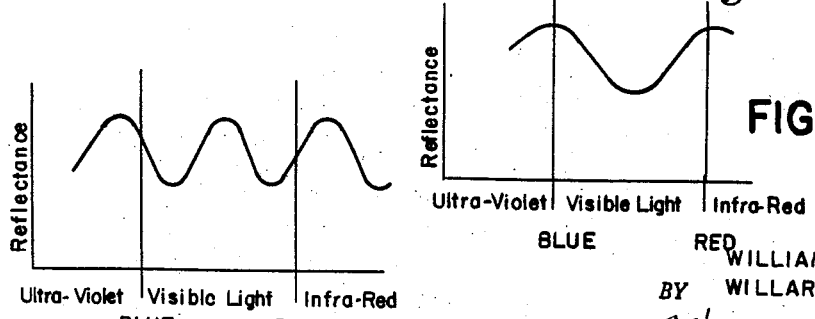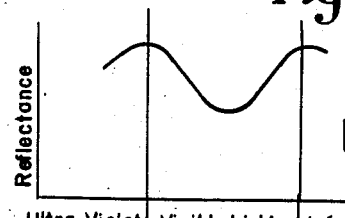

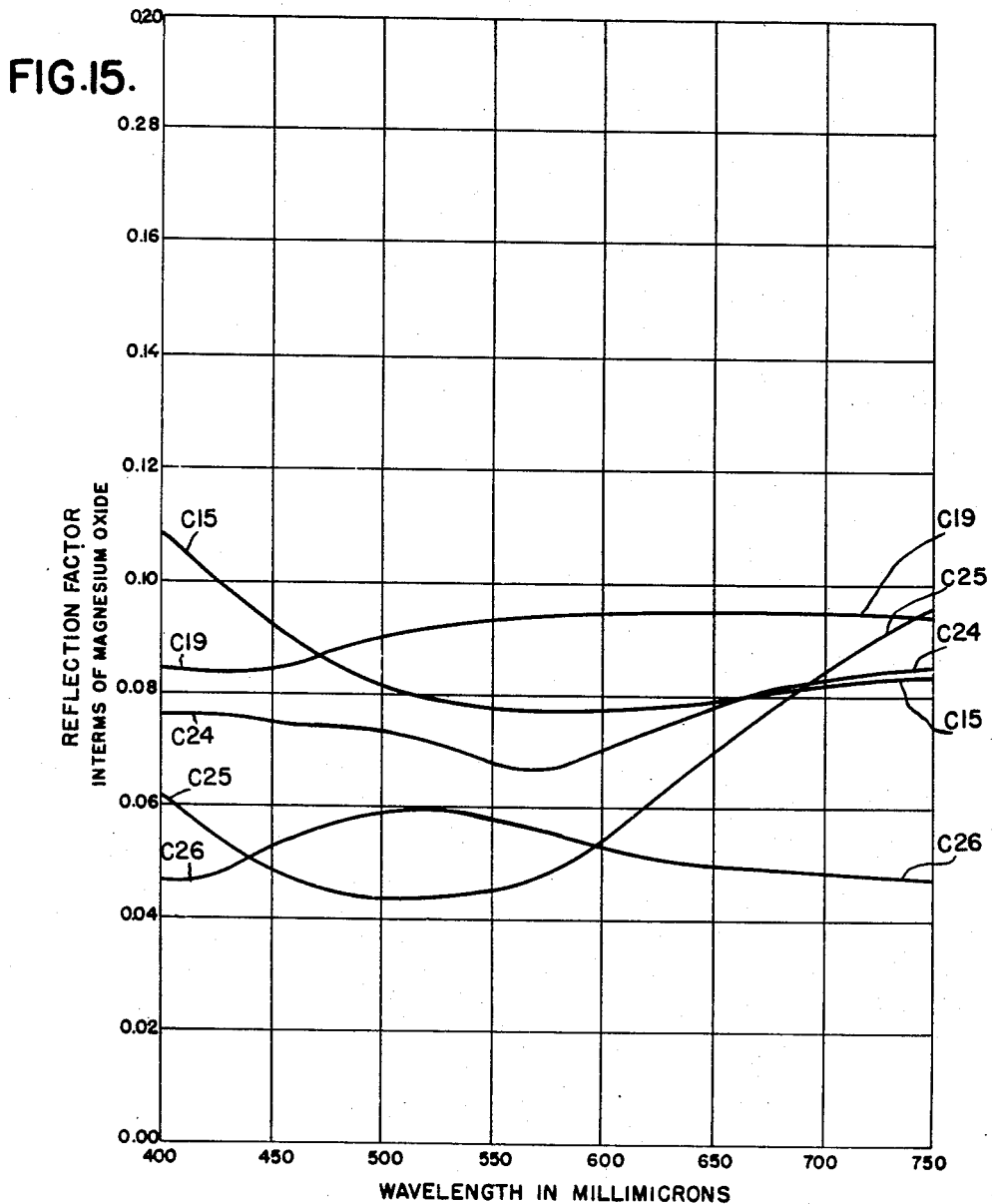

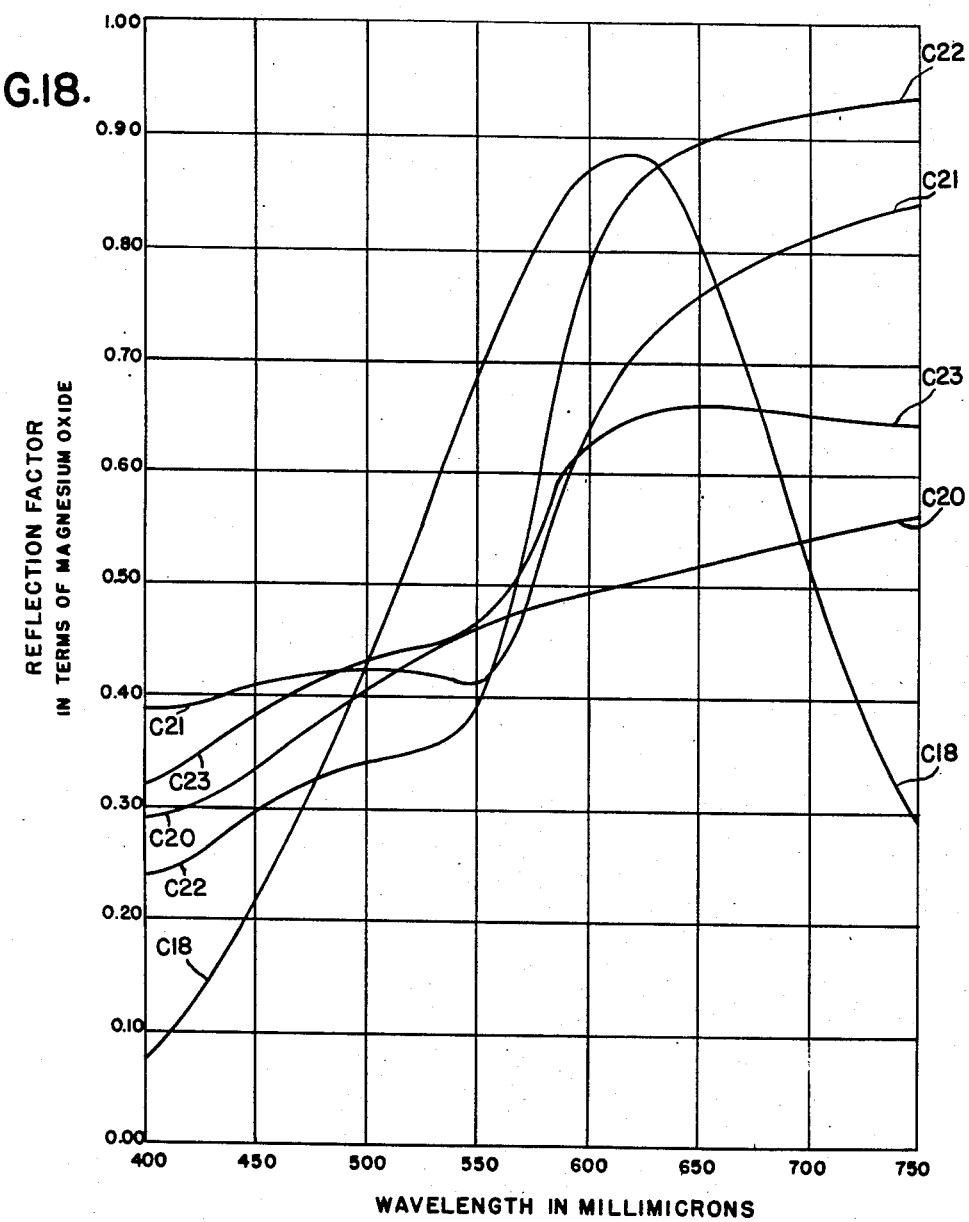

SEARCH ROOM

Patented Aug. 22, 1950

2,519,546

UNITED STATES PATENT OFFICE 2,519,546

COLORED MIRROR

William H. Colbert, Brackenridge, and Willard L. Morgan, Haverford, Pa., assignors to Libbey-Owens-Ford Glass Company, Toledo, Ohio, a corporation of Ohio Application February 11, 1946, Serial No. 646,876

16 Claims. (Cl. 88—105)

Our invention relates to colored mirrors. It has to do more particularly with the production of mirrors having desired color and reflectivity characteristics. More specifically, it relates to the production of mirrors of desired color wherein the color is obtained primarily by producing interference of light rays which strike the mirrors.

This application is a continuation-in-part of our copending application Serial No. 473,473, filed January 25, 1943, now Patent No. 2,430,452.

Despite the wide possible use of colored mirrors in furniture, store decoration, theater decoration and other decoration, sales displays, etc., and as automotive mirrors, and the possible use of colored reflective surfaces to add to the attractiveness of shaped glassware, there has been little use to date of such mirrors and surfaces due to the expense of producing them and the few shades available.

The accompanying drawings will aid in the understanding of our invention. In these drawings:

Figure 1 is a diagram showing spectral reflection curves for silver, gold, copper, and lead sulfide mirrors of the prior art.

Figure 2 is a diagram illustrating light waves of a single ray of a definite color.

Figure 3 is a diagram illustrating light waves of two rays of the same type vibrating in the same wave phase.

Figure 4 is a view similar to Figure 3 but showing the rays vibrating in opposite phase.

Figure 5 is a diagram illustrating how various light rays will be reflected from a reflecting layer.

Figure 6 is a transverse vertical view of a second surface mirror made with a single partially transparent reflecting layer.

Figure 7 is a diagram illustrating how various light rays will be reflected from a combination of multiple reflecting layers according to our invention, and showing some of the paths followed by the light rays.

Figure 8 is a transverse vertical sectional view of a second surface mirror made according to our invention employing a multiple number of reflecting layers according to this invention.

Figure 9 is a similar view of a second surface mirror made in accord with the invention employing numerous partially transparent reflecting layers of different materials and backed by an opaque non-reflecting layer.

Figure 10 is a transverse sectional view illustrating a first surface mirror made according to our invention which employs multiple reflecting layers.

Figure 11 is a view similar to Figure 9 in which numerous partially transparent reflecting layers of two different materials are employed in the mirror in spaced relationship in accordance with the invention.

Figure 14 is a view similar to Figure 10 illustrating another mirror construction in accordance with the invention in which some of the multiple reflecting layers are found upon each side of the support.

Figure 15 is a diagram illustrating various spectral reflection curves of mirrors made according to the invention.

Figure 16 is a diagrammatic spectral reflection curve resulting from the use of a single film approximating one quarter wave length in thickness.

Figure 17 is a curve similar to that of Figure 16 where the film is several quarter wave lengths.

Figure 18 is a diagram illustrating spectral reflection curves of various mirrors.

Figure 12:
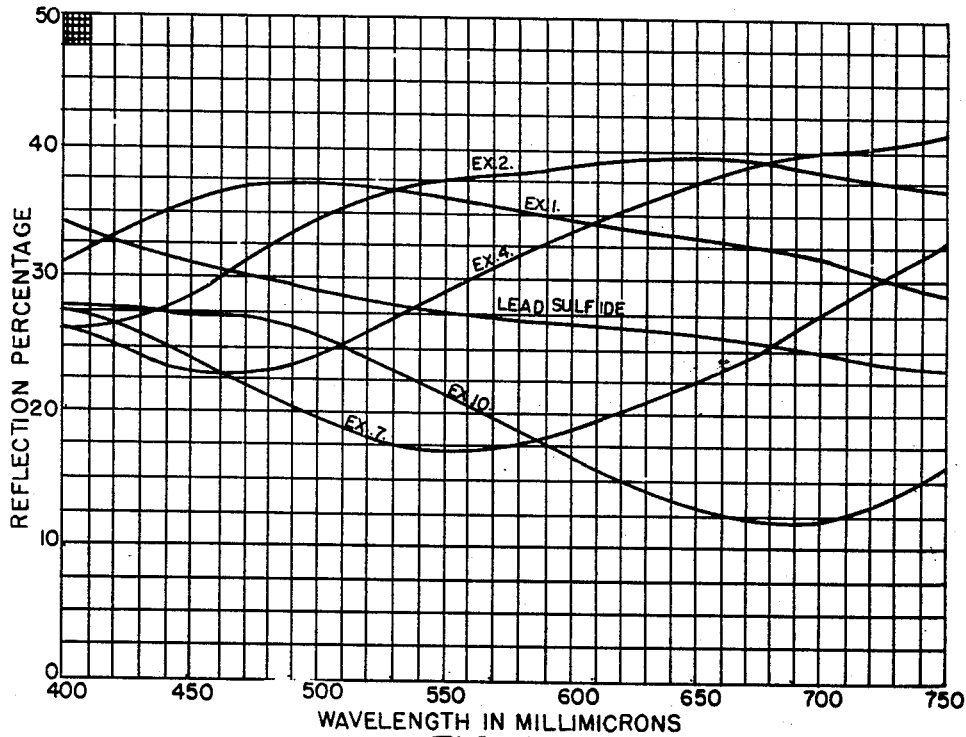
Figure 12 is a diagram illustrating for comparison a spectral reflection curve of a simple ordinary opaque mirror of lead sulfide and spectral reflection curves of our compound mirrors made by using a single semi-transparent film of lead sulfide in each of various thicknesses plus an opaque backing-up film of black lacquer.

Silver mirrors, of 88–92% reflectivity value, made with clear ordinary plate glass have no color, since all the various light rays are reflected approximately equally, as seen from the spectral reflection curves in Figure 1. Some colored mirrors have been used commercially which were made by silvering colored glass, the color thereby secured being the color of the glass. The color of the glass arises from the fact that the glass absorbs some types of light rays more than others and the light rays which are transmitted, with the least absorption, thus impart the color to the glass. Thus, "Solex" green glass, made by Pittsburgh Plate Glass Company, is green because it absorbs much of the red and blue light out of the white daylight as such light passes through the glass. A green mirror, made with silver on the "Solex" green glass, shows a reflectivity value, for visible light, of 61% and similar mirrors, made with a blue glass and a flesh colored glass, showed reflectivity values of 35% and 68.3%. These are all lower than the reflectivity value of silver on the colorless glass, by reason of the loss of the colored light, which the colored glasses absorb. The use of such colored glasses is expensive and, moreover, satisfactory quality for forming mirrors is not readily available.

Using plain plate glass, some colored mirrors have been made in which the color arises from the selective reflection of the various light waves of different colors to different degrees. Thus, gold mirrors show a spectral reflection curve, as shown in Figure 1. The gold mirror appears yellow because little green or blue is reflected while much larger amounts of yellow and red are reflected, the overall reflectivity of total visible light for gold mirrors being about 75%. The copper mirror, which reflects about 55% of all light, is orange-red, being different from the gold mirror in that most of the light reflected is red. Copper mirrors have not been commercialized due to the unreliable methods for their production. Gold mirrors are expensive and, therefore, have not gone into wide use.

The use of fuchsin or methyl violet dyestuffs in opaque layers for mirror surfaces has been suggested. Such mirror surfaces reflect 11.6% of the total visible light. Experience with such mirrors indicates that where such dyes are used as the reflective layer they must be present in fairly thick opaque layers and the reflectivity percentage is always low and the mirrors quite dark. The colors secured are invariably the complementary color to the normal color of the dyestuff when seen in solutions by transmission. Thus, methyl-violet gives a green mirror since the film transmits red and violet light and reflects, selectively, the green light which it does not transmit. Thus, the color in these mirrors arises solely by selective reflection, just as is the case with gold, which when viewed by transmission is green, the gold being relatively transparent to green light but opaque to the red and yellow light which it reflects selectively. Mirrors of this type are not stable, the films rapidly breaking up and spotting and in service the color soon changes to muddy non-reflective grays. As a result they have had no commercial use in spite of the demand for colored mirrors.

Mirrors made with platinum, iridium, or aluminum are silvery in appearance and without color, while those made with chromium, silicon or lead sulfide are dark and without color tone. Likewise, glass coated with asphalt or black paint, with reflectivity values of 5%, and mirrors of black opaque glass, with 5% reflectivity, are not very useful because of their extremely low reflectivity values and the very dark images which thus appear in such reflective surfaces.

Thus, despite the wide possible use of colored mirrors and colored mirror surfaces, there has been little use to date because of the expense of producing such mirrors and surfaces and the few colors and shades available, as shown above.

One of the objects of our invention is to provide colored mirrors or other mirrored surfaces of a wide range of color characteristics and of a wide range of reflectivity percentage characteristics which can be controlled as desired.

Another object of our invention is to provide mirrors or other mirrored surfaces of various colors and reflectivity values in which the colors are mainly secured by light interference effects and are permanent and inexpensive.

A further object of our invention is to provide mirrors or other mirrored surfaces of various colors and reflectivity values in which the colors are secured by light interference effects produced by two or more extremely thin partially transparent layers of different substances acting co-operatively to produce interference color effects, and in which the color and reflectivity of the mirror or article are further modified by an opaque non reflective backing layer.

Various other objects will be apparent from the following description.

The colors which appear in thin-walled soap bubbles and in very thin oil films do not arise from any inherent color in the soap film or in the oil. Also, in these cases, it is well recognized that the colors do not come from any selective color light absorption effects, as the soapy water and oil do not show such colors directly. As the soapy water and oil in bulk are also clear and transparent and non-reflective, it is apparent that the colors do not arise from any selective reflection of light. The colors are known to occur from interference of the light rays, which results in a neutralization or loss of certain colored lights and the residual light which then appears is, obviously, colored. The particular color of light rays removed by interference is dependent upon the thickness of the film and its refractive index, as will be shown later. It is well known that interference colors can only appear in extremely thin films which are of a thickness comparable to one-fourth the wave length of light and which are at least partially transparent.

We have found that by depositing reflective coatings of various materials in extremely thin films which are still partially or considerably transparent that the two or more extremely thin semi-transparent laminae of different substances will act cooperatively to produce light interference colors and upon backing these with a substantially opaque non specular reflecting coating of another material, we can secure a wide range of colored mirrors of various reflective characteristics for the various rays of light and in terms of total light reflection. We obtain these effects by simple and inexpensive means and colored substances or colored glass are not necessary. The colors are permanent and do not fade or alter, as they are dependent primarily upon physical light interference effects. The substantially opaque non specular or non mirror reflective backing need not be colored although it may be, but it is of a different refractive index from the immediately adjacent contacting layer of semi-transparent reflective material and by its substantial opaqueness it prevents viewing of the background through the mirror.

We have found that by the controlled deposition of very thin uniform semi-transparent films of many materials we can secure reflecting bodies of a wide range of color and reflectivity characteristics. The material used as the reflecting substance in any of the layers in the products need not have any inherent color. Such mirror bodies have been described more particularly in our co-pending applications Serial Nos. 473,473 and 473,474, filed January 25, 1943, and in Serial No. 476,076, filed February 16, 1943 (now Patents Nos. 2,430,452, 2,411,955, and 2,394,533 respectively). By backing the composite of the semi-transparent mirror layers with a substantially opaque or semi-opaque layer of a material of no specular reflectivity, which may or may not be colored, we produce by the cooperative action of the various reflective layers and the backing entirely new and different mirrors with characteristic color and reflectivity properties. Other combinations of reflective layers may be employed according to our invention. For example, we may employ semi-transparent interference layers, backed up by a transparent layer, which may have color, and which is backed up by a substantially opaque layer. Any desired number and arrangement of layers upon a support such as glass may be provided as long as at least two semi-transparent interference color producing layers are present in the structure in immediate contact and the mirror structure is backed up by at least one layer which is opaque or sufficiently opaque to prevent viewing of the background and which is of a non specular reflective nature.

The development of colors by light interference has been explained upon the basis that light radiations are of a wave form, such as shown in Figure 2, which represents a single ray of a definite color. Blue light differs from red in that the length of the waves is shorter, in the case of the blue, and longer, in the case of the red. The other visible colored rays of light are of intermediate wave lengths. White light is composed of a mixture of all of these visible rays. If two rays $a$ and $a1$ of the same monochromatic type or wave length happen to be vibrating in the same wave phase, as in Figure 3, they amplify each other and the intensity is increased. However, if they happen to be vibrating in opposite phase, as shown at $a2$ and $a3$ in Figure 4, they interfere with or oppose each other and a loss of light intensity results. Thus, if in some way we can make some of the blue rays in ordinary white light get out of phase with other blue rays of the same wave length, we can remove some of the blue from the ordinary light. The remaining light will then no longer be white but of a color resulting from the remaining green, yellow, orange and red rays and will appear a reddish-yellow color.

If we consider two light rays impinging upon a reflecting substance $s$, as in Figure 5, and assume that ray $b$ is reflected at the top surface $c$, while ray $d$ passes on through the semi-transparent layer $s$ to the bottom surface $e$ before it is reflected, it is apparent that the second ray has had a longer path to travel before it again emerges from the top surface $c$ of the layer $s$. Thus, the ray $d$ lags considerably behind the ray $b$ and in consequence, the crests and troughs of the waves of the two rays $d$ and $b$ can be arranged so that the difference in phase is such that interference of the waves of two of such rays, entering or being reflected at any point on the surfaces of $s$, will occur. The time difference between the waves of the two rays will be dependent upon the thickness of the layer $s$ and the speed with which the given light ray travels in the material comprising the layer $s$.

As the number of complete wave cycles which any given monochromatic light ray makes per second or its frequency is a fixed constant, the variation in speed of travel of the light ray in different media causes a shortening or lengthening of the actual length of a wave as it travels through the various media. Wave lengths for light are generally given with reference to their values in traveling through air and the speed of travel for all light rays in this medium is given as 299,910,000 meters per second. In denser materials, the light rays move more slowly and all the light rays do not necessarily move at the same speeds. The proportionally constant N between the velocity of light in a given substance and the velocity of light in air is called the refractive index for that substance.

$$N = \frac{\text{velocity in air}}{\text{velocity in substance}} = \frac{\text{wave length in air}}{\text{wave length in substance}}$$

If by $\lambda_a$ we indicate the wave length in air and by $\lambda_s$ the wave length in some other substance, it is apparent that these are simply related as follows:

$$\lambda_s = \left(\frac{1}{N_s}\right)\lambda_a$$

N varies somewhat with different monochromatic waves of different wave length but a similar equation holds for each wave length considered. In general, as the variations are usually small, a single constant for N can frequently be applied for all waves in the visible light range.

In order for the ray $d$ to come out of the top surface and be 180 degrees out of phase and to thus interfere with the ray $b$, it must be slowed down in time and distance equal to the distance of one half of a wave length of the ray in air, i. e., $$\frac{\lambda_a}{2}$$

As the ray is travelling only 1/N as fast in the substance $s$, comprising the layer, and must traverse the thickness of the layer twice, the thickness of $s$ required to cause an equivalent slowing effect is then $$\frac{\lambda_a}{4N_s}$$

In a similar way, thicknesses equal to 1, 3, 5, or any uneven integral multiples of this quantity should also show interference effects. If the ray $d$ is reflected within the layer $s$ not once but two times, it is apparent that the film needed for interference need be only $$\frac{\lambda_a}{8N_s}$$

thick. Thus, as shown in Figure 5, wherein the ray $f$ is shown as an inclined ray striking the surface of the layer the light ray is reflected twice within the layer. If the ray is reflected any number of times, such as R times, then the film needed is thinner and is of a necessary thickness as given by $$\frac{\lambda_a}{4N_sR}$$

Furthermore, it is apparent that similar thicknesses equal to 1, 3, 5 or any uneven integral multiples of such quantities will show interference effects with rays which are multiply reflected within the layers. Thus, the suitable film thicknesses for our films or composites of contacting partially transparent films are of the order of one-fourth of a wave length of any visible light ray or some small multiple or submultiple of this, divided by the refractive index of the material used in the semi-transparent film or films.

Since the various colored rays of light have different wave lengths and these range from 4000 to 7500 Angstrom units or 0.4 to 0.75 micron or thousandth millimeters in the visible spectrum, it is obvious that a semi-transparent film which is thick enough to cause interference with the short blue rays will not cause interference with the long red rays, etc. Thus, each thickness of semi-transparent film will take out certain defined portions of the spectrum and a film will take on a series of different colors as the thickness is varied. As will be shown in the examples which follow, the colored mirrors of our invention produced by light interference, show varied colors, depending upon the thickness of the semi-transparent mirror film or films employed. In the spectral reflection curves for these mirrors, the portion of the curve and minima of reflectivity caused by interference, shifts from the blue range of wave length toward the red, as the semi-transparent film or films are each made thicker.

In Figure 16 there is shown a generalized diagram of the spectral reflection curve type found with our mirrors when a single semi-transparent mirror film approximating a one quarter wave length of light thickness, $$\frac{\lambda_a}{4N}$$

or a group of two or more such semi-transparent mirror films are employed cooperatively to approximate a one quarter wave length of light in optical thickness; the mirrors in each case being backed by an opaque essentially non reflecting layer. The location of the minima shifts with increasing thickness as indicated above, the minima being clearly the wave length of light removed by the light interference effect and the wave length to be considered in establishing the optical thickness of the semi-transparent mirror or reflective film or similar multiple cooperating films. As the total optical thickness of the single semi-transparent film or semi-transparent cooperating films becomes a multiple of a quarter wave in thickness such as 3 or 5 the distance between adjacent minima in the spectra becomes smaller as shown by the generalized diagrammatic spectral reflection curve for mirrors of such type made under this invention as shown in Figure 17.

The semi-transparent film or films must be continuous and of very uniform thickness, if the color is to be the same throughout the mirror. This has called for special means of producing such semi-transparent reflective layers, in view of the extreme uniformity and extreme thinness of the semi-transparent layers desired. On the other hand, it is within the scope of our methods to produce colored mirrors of mottled or variegated colors where the semi-transparent film thicknesses of one or several of such films are deliberately varied to cause such effects.

Interference effects in perfectly transparent materials or in cooperatively acting multiple layers of these in immediate contact do not occur at thicknesses beyond about the ninth multiple of the quarter wave length factor already described. In semi-transparent materials, the increasing absorption of light by the increasing thickness of film, which is exponential with respect to the thickness, may soon leave so little light reflected from the bottom surface $e$ that no interference effect can be found in the reflected light which is then coming entirely from the top surface $c$. Obviously if a mirror film is opaque all of the light is absorbed before ever striking the bottom surface $e$ and, therefore, no light is thrown back to cause interference effects, particularly as the film obviously must be traversed twice if interference is to be obtained. Since most commercial mirrors have been made with mirror layers thick enough to be opaque, they have not shown any interference colors and their entire reflection occurs at the top surface of the mirror layer. The occurrence of interference by multiple reflection within the layer or layers, as shown in Figure 5 with ray $f$ and in Figure 7 with rays $n$, $p$, $q$, $o$ and $t$ originating from light ray $j$, is very quickly limited by the transmission values for the film or films and, in practice, we have not found evidence for more than two to four such internal reflections although more may occur in the more highly transparent films and in the thinnest of the films.

It is thus apparent that the amount of light which comes back through our semi-transparent mirror film or films and is then available at the upper surface or intermediate surfaces to cause light interference effects is a function of the transparency of the material or materials used in the semi-transparent layer or layers, the transparency being considered with respect to the particular wave length of light at which interference is developed as determined by the film thickness or cooperating film thicknesses. The transparency of the film or films with respect to ordinary visible light generally is thus important and we use films which are partially or semi-transparent or which show a visible light transmission of 10 to 90% in the thickness employed. Preferably at least one of the partially transparent reflective films should have a transparency in this range and the other or others in a laminae of cooperating layers of different substances may have even higher transparency. Where all the partially transparent thin films are of over 90% transparency we can still prepare our colored mirrors but the mirrors are of low color saturation.

The amount of light reflected from the surface of a single semi-transparent layer is a function of the refractive index, being greater the larger the refractive index for the substance comprising this film, and we find it also becomes greater as the thickness of the semi-transparent film increases until it is opaque. While it may thus be an advantage to use a material or materials for the semi-transparent mirror layer or layers which have a high refractive index to secure greater brilliancy of reflection and to permit the use of thinner, more transparent films, thus giving greater efficiency of light removal by interference and thus giving purer and deeper color tones, we do not restrict ourselves to the use of any particular range of refractive index materials but may use a wide range of substances. It is apparent that a material of about 50% reflectivity value, when viewed in a normally opaque thick film, which can be laid down in very thin films which are of high transparency, will show the brightest and deepest interference colors as mirrors. We may, however use materials which in their ordinary opaque films or in bulk show much higher or lower reflectivity values than this and are not restricted to any range in this constant, although values lying between 80 and 20% are preferred. Thus, thin calcium fluoride coatings will reflect something less than 10% of the light at the top surface and are very transparent (approximately 96-97%) and the reflected light coming from the back surface causes interference colors to develop but the depth of color resulting is low due to the white light mixed with the colored light being of a high intensity. It is necessary that the film or films used for our mirrors have the characteristic of giving some specular or mirror type reflection of light, since diffuse type reflection is not satisfactory. As shown by the calcium fluoride this reflected specular type reflection of light can be quite small from a given layer.

The statements of the preceding paragraph have discussed the usual reflectivity of a single film of material in contact with air and the relationship of such reflectivity to the refractive index of the material comprising the film. The reflectivity (R) at perpendicular incidence of light of a layer of material in contact with another continuous media at the interface between the two media is known by optical principles to be related to the refractive indices ($N_1$, $N_2$) of the two media as follows:

$$R = \left(\frac{N_1 - N_2}{N_1 + N_2}\right)^2$$

As the refractive index of air is one the relationship simplifies for a single film of continuous nature as discussed above. With the partially transparent films of solids of continuous nature employed in contact with each other in forming our mirrors it becomes apparent that the reflectivity conditions applying at the various interfaces between such and at any interface between these and the support for the mirror are determined to a large degree by the refractive indices of the two adjacent contacting materials or films. While it is often of some advantage that these be of considerably different refractive index, materials of closely similar such indices may also be employed.

If adjacent layers of different materials are of the same refractive index then no reflection occurs at the interface between such layers and the two layers will cooperatively act as a single layer of such refractive index and a ray of light will act in such two layers as shown for the single layer $s$ in Figure 5. The limiting light absorption of the composite is then a joint result of the individual absorptions of the layers. While some or all of our adjacent partially transparent reflective films of continuous nature and of different substances may be of similar refractive index and thus act cooperatively we generally employ such adjacent contacting and cooperating films of different materials having different refractive index. It is necessary however that in order that a partially transparent reflective film contacting a surface of the support, such as a glass plate, be of different refractive index from that of the support if such film is not to become optically a part of the support. On the other hand where the film contacting the support and the support are of the same index of refraction and where there is also present one or more other partially transparent layers of different refractive index and of the desired range of thickness in the mirror structure and an opaque layer backing is employed, colored mirrors will be produced according to this invention, such other films and backing determining the color and generally the reflectivity of the mirrors.

It is desirable but not entirely necessary for the purposes of this invention in order to bring about the desirable action of the opaque backing layer in modifying the color and reflectance secured in our mirror structures that the index of refraction of such backing layer be different from the index of refraction of the contacting partially transparent reflecting layer or the index of refraction of the contacting support material.

As will be apparent from the drawings representing our mirror structures and from the above discussion our thin partially transparent reflective films are layers of materials in a continuous solid form such as can optically act as a layer or layers and cause interference and they are in no case coatings made up of small separate isolated discrete areas or spots covering only a part of the contacting surface such as might cause color phenomena by diffraction of light.

As the opaque backing layer used in constructing our mirrors, we prefer to employ paints, or other pigmented coatings such as those having a shellac or lacquer base. Our opaque backing is such that it prevents viewing of objects through the completed mirror and the opaque backing is such as to be without specular or mirror reflecting qualities. While we may use a black paint or lacquer which has practically no light reflection we may use other opaque coatings which reflect some light in a diffuse or scattered manner and which do not reflect light specularly. Thus, we use white paint backings which give a high percentage of reflection of light as scattered light such as 40 to 80%, or we may employ similar paint coatings which are of various colors such as pink, red, blue, green, yellow or orange.

We find that when our thin semi-transparent reflective films in which interference colors are developed are backed up with a relatively thick opaque or substantially opaque film of the above described character that light which is normally lost out of the back of our thin semi-transparent mirror film or cooperating contacting laminae of such, is reflected and returned out through the face of the mirror combination in some cases resulting in generally higher reflectivity values or in altered reflectivity values. Thus, in Figure 5, the dotted arrows $g$ and $h$ indicate some light which is normally transmitted through the semi-transparent mirror film $s$ which is not reflected at surface $e$, and which is consequently lost out the back of the mirror. By backing up the semi-transparent mirror film $s$ (or similarly a multiple layer of such contacting films) with an opaque body, we attain a reflection of a considerable portion of the light represented in rays $g$ and $h$ in Figure 5. As the backing employed reflects scattered or diffuse light, the light returned by the opaque backing is of different quality and such diffuse or scattered light is not available or not useful for interference with the light rays reflected from the surfaces and interfaces formed by the various reflective layers in the mirror. Where the opaque backing is pigmented with a colored pigment the scattered light thus returned out through the face of the mirror is modified by light of the same color as the pigmented opaque body. Furthermore, the opaque backing is found to modify the color of the mirrors produced when employing a given composite of thin partially transparent layers which in themselves inherently produce light interference in that when the backing layer is of a different refractive index from the contacting layer or support there is formed a reflective interface and the light reflected from such interface is reflected specularly and such reflected light is available to cause interference with other light rays either reflected at the front surface of the mirror or at the various other interfaces. The light specularly reflected by the partially transparent mirror reflective layers comprising the composite element and the light specularly reflected at the lower surface of the support or partially transparent film element in contact with the opaque backing serve to form readily discernible clear mirror images in the mirrors produced and the images and mirrors are colored by the cooperative light interference effects which occur. The backing also makes a useful commercial mirror out of the otherwise partially transparent and reflective films by preventing the light from the back coming through the mirror and by preventing the visibility of images behind the mirror construction.

Furthermore, for example, if the semi-transparent mirror film or cooperatively acting laminae or layers of such multiple films is of a thickness that the reflected blue rays, for example, are out of phase and are, therefore, destroyed by interference, this increased reflection for blue light at surface $e$ results in more light for interference at the top surface $c$ and greater destruction of blue light. Thus, the red color of the mirror is also intensified. For this to happen it is not only necessary that the semi-transparent film or films be fairly transparent to blue light but that the interface at the bottom surface of the layer in contact with the relatively opaque backing reflect blue light. If the semi-transparent layer or layers are also good transmitters of red rays and the interface at the top of the opaque layer reflects red rays, an intensification of reflected red light is secured by the use of the substantially opaque backing layer. Thus, still greater intensification of the red color of the mirror or mirrors is secured. It is thus apparent that a wide variety of colors and reflection values can be secured in our mirrors. It will be apparent that the opaque backing must be of a different substance than the contacting layer.

It will be apparent that the light transmission characteristics of the semi-transparent reflective films will have an effect upon the color of the mirrors produced. Thus, for example, if we use a lead sulfide film which selectively transmits very well in the red, it is apparent that these red rays will penetrate into the mirror to a greater degree than the other colored rays of visible light. In turn there will be a greater proportion of these red rays returning to the face of the mirror if the interfaces reflect such rays. More of such red light is thus available to cause interference providing the composite partially transparent film element is of a thickness to cause interference with such red rays. If the latter is the case then red is removed to a greater degree than might otherwise be expected. At other thickness of the partially transparent layers of lead sulfide film interference in the red is not occuring and there is a large proportion of red light in the reflected light. If a gold film which transmits green to a high selective degree is employed the green rays will be found to be similarly largely removed or strongly present in a manner corresponding to the discussion just given. Thus selective absorption effects within our partially transparent films tend to increase the degree of interference in some cases and in other cases tend to give coloring effects resulting from the specific light absorption or transmission effects of such films.

As a material suitable for the forming of the very thin semi-transparent reflective layers, we have found the use of very thin films of lead sulfide to give particularly attractive results. In its use in the normal opaque mirrors of fairly thick films, it is a practically colorless mirror, as shown by Figure 1, which shows the reflectivity, about 30%, for all the wave lengths of light to be about the same. It has a high refractive index of 3.9 and is quite transparent in the thicknesses which will cause interference effects. Gold, having a refractive index of 1.18 at 4400 Angstroms and of 0.47 at 5890 with a normal reflectivity curve, as shown in Figure 1, is quite transparent in very thin films to green light. So also is copper which reflects, as shown in Figure 1, when in opaque films and which has a refractive index of 1.10 at 5000 Angstroms and 0.44 at 6500. Both of these substances, either alone or in combination with partially transparent layers of other substances, may be used in providing mirrors of a range of colors, when used in films which are semi-transparent and which are sufficiently thin to cause color development through light interference effects. Other sulfides of a metallic luster, such as stibnite and molybdenite, having a refractive index of 4.3, and each of about 40% general reflectivity in the visible range with a slight bluish cast, are quite suitable. Pyrite, which reflects a maximum of 60% in the red and a minimum of 45% in the blue, may be used as a single partially transparent film or as a film in a composite element comprising a plurality of thin partially transparent films, as may also silicon, normally of about 38% reflectivity, and having a refractive index of 3.8 to 4.2. Antimony, having a refractive index of 1.62 and a reflectivity of about 55%, can likewise be used. Fluorite or calcium fluoride, having a refractive index of 1.43, and other fluorides of about the same refractive index, such as magnesium fluoride having an index of 1.38, may be used as a reflective layer, although these very transparent substances are of low reflectivity values as previously mentioned. Thus, for fluorite alone the estimated reflectivity value would be 3 to 4% uniformly throughout the visible range and very thin films of this material give low reflectivity values and give light interference tints where used as separate single films.

It is also possible to use films, which are in the desired thin range and which cause interference coloration of mirror type reflectors in which the film is a jointly deposited mixture, chemical combination, or alloy of film-forming materials. For example, a jointly deposited mixture of gold and lead sulfide is suitable.

While no color need be present in the material or materials used as the semi-transparent reflecting layer or layers, such as in the case of lead sulfide, the use of such materials as gold, showing selective specular reflection, as the semi-transparent layer, brings an additional source of possible variation of both the hues and spectral reflectivity characteristics in our final compound mirrors produced by using these layers backed by a substantially opaque layer. The choice of a material for the semi-transparent reflective film which has color characteristics in its normal reflection, such as gold, imposes its normal reflection spectral limits, to some degree, on the general nature of the light reflected by the film and from which various spectral components are subtracted by the light interference effects, depending on the thickness of the film used and its refractive index. Thus, in general, our compound mirrors made with a very thin semi-transparent layer of gold film or of such gold and magnesium fluoride films are of higher total reflective values and thus brighter, and also of particularly higher reflectivity in the yellow and red, than are similar compound mirrors having thin semi-transparent layers of lead sulfide, or of lead sulfide and silica, the colors and reflectivities, in each case being derived, to a main degree, by the interference effects arising from these layers in combination with the normal reflective characteristics for these materials and, in turn, further modified by the nature of the substantially opaque backing used. Cuprite or cuprous oxide, which is a bright red and gives a reflectivity in bulk of about 20% and has a refractive index of 2.7, as well as ordinary cupric oxide have been found to be quite satisfactory as materials for use in the semi-transparent layers in making our compound colored mirrors.

While silver or aluminum alone as a single layer do not lend themselves to giving colored reflective mirrors due to failure of light interference to occur in these single films, we have found, when employed in mirrors in very thin partially or largely transparent layers with other thin films of different substances, that excellent interference colored mirrors are obtained when a suitable opaque backing is applied to such structures. Other silvery metals may also be used in forming the thin partially transparent layers which either singly or in combination with other metals or materials in multiple composite layers of such nature are employed in forming our mirror structures. Thus, for example, platinum, iron, or cobalt or even the darker metals, such as chromium, are suitable. Most oxides, sulfides, selenides, tellurides, and halides of inorganic nature may be employed in forming the thin partially transparent reflective layers in our mirrors and by way of example, but not by limitation, we may add to such substances already enumerated, silica, lead oxide, magnesium oxide, silver oxide, aluminum oxide, arsenic oxide, tin oxide, titanium oxide, iron oxide, zinc sulfide, copper sulfide, lead selenide, lithium fluoride, silver chloride, sodium chloride, lead chloride, and lead fluoride. Most any solid inorganic material may be used and we may also use similar thin partially transparent layers of solid organic materials, and particularly of plastic materials such as the polymethacrylate resins. The commercial polymethacrylate plastics have a refractive index of approximately 1.49.

The thin partially transparent layers may be produced in several ways to secure the necessary uniformity and continuity of thickness in our semi-transparent reflective films and thereby secure uniformity of color and reflectivity characteristics throughout a mirror body and at the same time permit control of the forming of the desired thicknesses in such films. Deposition from a solution as a support is withdrawn from such solution at a constant rate is a well known method applicable to the organic materials generally and suitable for such other simple inorganic substances as are readily soluble. Where the mirror films are deposited chemically, the deposition reactions must be greatly retarded, as compared with former operations. Thus, the reaction mixtures and temperatures of deposition must be changed toward slowing down the entire deposition process so as to give more uniform and even development of crystal nuclei and even slower than normal rates of growth onto these nuclei. This deposition process is described more fully in our copending application directed to Method of Making Colored Mirrors, Serial No. 473,474, filed January 25, 1943, (now Patent No. 2,411,955), and in the following examples. We find the deposition of our very thin semi-transparent reflective films by thermal evaporation of the substance within a high vacuum to be a particularly attractive method.

A discussion of the various figures illustrating some of the mirror structures that may be made under this invention will bring out the wide diversity of possible arrangements of the several films involved in such structures and indicate how the composites of partially transparent reflective films cooperate together and with the backing layer of different materials to give visually colored mirrors in which objects are clearly visible as images and in which the background cannot be viewed because of the opaqueness of the backing layer. It will be understood that in the figures like reference numbers indicate similar types of layers, or supports, and that the thicknesses as indicated by the drawings are solely for the purposes of illustration and that such thicknesses do not show the true proportions of the layers actually used in constructing our mirrors.

The sectional view of Figure 6 illustrates a second surface mirror made according to our invention and which consists of the glass or other transparent support 1, the single continuous semi-transparent mirror film 2, and the substantially opaque backing 3.

As some of our compound mirrors may be easily scratched or otherwise spoiled, we may coat the back of the substantially opaque backing with a thicker protective layer of a paint, lacquer, or shellac. Such last applied protective coatings do not take any part in the optical functioning of the mirror. We may also form our mirrors by disposing the semi-transparent film on the front surface of the support and the substantially opaque film on the back surface of the support.

In Figure 8 there is represented a second surface mirror structure which differs essentially from that of Figure 6 in that the composite, partially transparent light reflective film element 5 is used instead of the single film element 2. This composite film element comprises the two partially transparent layers 6 and 7 which cooperate in producing interference coloration and in giving reflectivity. A protective coating 4 also covers the backing.

Figure 9 illustrates a structure similar to that of Figure 8 but differing essentially in that the composite element 8 comprises the three partially transparent layers 9, 10 and 11 which cooperate in producing interference coloration and in giving reflectivity.

In Figure 10 there appears the first surface mirror structure comprising a support 1 which need not be transparent, the opaque mirror layer 3, and the partially transparent reflective layers 12 and 13 forming the composite element 14. This composite element cooperates with the opaque backing to determine the color and reflectivity of the mirror structure. The mirror may be protected on its front face by a transparent lacquer film 15 which may also be colored, if desired, such film being thicker than nine quarter wave length factors to prevent the same having any light interference effect.

Figure 14 represents a complex mirror structure made in accordance with the invention in which the contacting thin partially transparent layers are upon the opposite side of the support from the opaque backing and in which a further single partially transparent layer is in contact with the backing. Thus, upon the front side of the transparent support 1, the layers 16 and 17 are contacting thin laminae which cooperate in giving interference effects, and upon the back of the support the layer 18 is the single layer of suitable properties and thickness to cause interference effects, and backing this is the opaque backing 3. The film 4 is merely a protective paint or other coating and the film 15 is of the transparent protective type as discussed in connection with Figure 10.

The mirror of Figure 11 comprises the glass support 1, the three partially transparent layers 19, 20 and 21, and the three partially transparent layers 22, 23 and 24. The layers are backed by an opaque backing 3, and this in turn may be protected if desired by a paint or other coating 4. The several layers 19, 20, 21 may each be of similar thickness or varied and of the same or different material. The same may be true for the layers 22, 23 and 24. In such a structure the large number of semi-transparent layers act cooperatively together to form the composite element 25, and this composite element and the opaque backing determine cooperatively the color and reflectivity of the mirror so produced.

While our compound mirrors receive their colors from the thinness of the upper reflective film or films and the resultant light interference, and from the nature and reflective character of this film or films, and further from the nature of the substantially opaque backing layer, it is apparent that we can further modify the color range and reflectivities of our mirrors, if we use instead of colorless glass, as the mirror support, a colored glass or other colored support body of transparent material. The color absorption characteristics of the support will limit the total reflectivity percentage possible and shift the general tones of color in the direction of the color of the glass or support material used. Similarly colored transparent layers thicker than $$\frac{9\lambda}{4N}$$

and without light interference effect may also be introduced into the sturctures in any suitable arrangement.

While the necessary thickness in a single partially transparent film or layer when used alone in our mirrors with the backing layer needs to approximate a quarter wave length factor of $$\frac{\lambda}{4N}$$

or some simple multiple of this, or where multiple reflection of R times is possible, some submultiple such as $$\frac{\lambda}{4NR}$$

to develop light interference colors, we find that, when employing a composite laminae of different substances to cooperatively produce light interference colors any one or more of these films may be of any extreme thinness, as long as they are continuous, but that any such film may not exceed a maximum thickness of $$\frac{9\lambda}{4N}$$

if it is to function in part in determining or giving light interference colored reflected light or mirror images. Thus we have employed individual films in our cooperating laminae of partially transparent reflective layers which have ranged as low in thickness as the .004 part of a $$\frac{\lambda}{4N}$$

factor and as high as $$\frac{3\lambda}{4N}$$

to $$\frac{5\lambda}{4N}$$

and we find films in the range of .01 to 2.5 times the quarter wave length factor $$\frac{\lambda}{4N}$$

in thickness to be particularly useful.

In the composite combinations of adjacent contacting partially transparent layers we may employ any combination of substances such as all the films being of metallic nature or of nonmetallic or of organic nature, such for example, as adjacent thin copper and silver layers backed by an opaque backing or adjacent zinc sulfide and sodium fluoride layers; or these may be of mixed natures such as copper and magnesium fluoride or silica and copper. It will be apparent however that the order of arrangement of any given group of layers of different substances in the mirror with respect to the face of the mirror will result in mirrors of different color and reflectivity qualities as the layers are variously arranged with respect to each other.

Thus a second surface mirror having a film of copper of .030 micron and transmitting 20% of light when deposited on glass gave a composite mirror, when further coated with a transparent layer of .080 micron thickness of magnesium fluoride and a final coating of an opaque black paint which was of red yellow red color and of 50% overall reflectivity. When a similar thickness of magnesium fluoride was first deposited upon the glass and this was then coated with the same .030 micron of copper and the latter then coated with the opaque black paint, a second surface mirror of a brighter and whiter tone was secured of color yellow red to yellow red yellow, the reflectivity being higher (52%) and the degree of interference coloration being less.

Consideration of the various possible reflections at the different interfaces and of the internal multiple reflections of light within a composite mirror structure, as diagrammatically shown by the light rays in Figure 7, shows that the light may follow many alternative courses to various degrees depending upon the total and selective light transmission character and the action of the various films and the reflective indices of the adjacent layers and consequent reflective conditions at each of the interfaces, and as these rays are also modified by the opaque backing. Thus, in the mirrors just described the second surface mirror comprising the arrangement glass-copper-magnesium fluoride-opaque black paint arranges these materials so that the refractive indices of the adjacent substances follow the sequence 1.56–(0.44 to 1.10)–1.38(?), while in the second mirror arrangement glass-magnesium fluoride-copper-opaque silver the sequence of refractive indices of the adjacent layers is 1.56–1.38–(.44 to 1.10)–(?) (the refractive index of the black paint coating was not known). It will be observed that the various differences in index of refraction of adjacent layers is generally lower for the second arrangement of the materials and consequently the relative reflection occurring at the various interfaces is less than in the first mirror construction and the interference action is less complicated and not as much light is apparently affected in such manner. While the adjacent layers may thus most effectively be arranged for maximum color developed by arranging the adjacent layers to show the most abrupt changes in index of refraction it is apparent that for the purposes of producing our mirrors most any arrangement will suffice and produce our desired color and reflectivity effects to some desired degree.

As previously indicated where the adjacent contacting partially transparent layers are of the same refractive index these layers cooperate in producing light interference in a manner just as a single film of the total thickness of such layers, neglecting differences arising from absorption effects. Where the adjacent contacting partially transparent layers are of different refractive index each film acts to retard the passage of a light wave through itself to a degree dependent upon its thickness and refractive index. Such retardations upon light rays such as a ray J in Figure 7 may act alone upon the rays directly reflected after passage through the top layer such as with ray L or multiply reflected ray N. Such rays can then cause interference with the ray K reflected directly from the top surface of the mirror. The retardations in the various contacting layers however are additive or cooperative in effect with each other after passage of the light into the subsequent layers as would be true for such rays as M or P or the other multiply reflected rays such as O, T, and Q. It is apparent that each ray would show various and different retardations and that each may show interference with the front surface reflected ray K or similar rays or with others of the various rays such as those illustrated. The relative strength of the separate rays varies with the reflective conditions at the various interfaces and the light absorption effects experienced in passage of the rays through the layers it travels through.

Thus the conditions of interference and reflection are extremely complex but the various films cooperate in securing the necessary retardation of some rays of light to get these out of phase with others and to thus cause the development of color by such light interference effects. As previously indicated, color is developed by the various possible combinations of thicknesses among the separate partially transparent reflective films, each such film apparently cooperating with the other such films in producing the light interference. As the respective films forming the composite element are varied in thickness the various colored mirrors thus resulting vary in color continuously as either film is changed in thickness. Reducing the thickness of one layer, such as a copper layer, and increasing the thickness of the second layer, such as silica, has been found to result in producing approximately the same colored reflective mirrors. This indicates a general hyperbolic relationship between the thicknesses of the two layers and that they cooperate or replace each other giving a color effect dependent upon some cooperative or summation effect of the two films.

The fact that the same color appears in sets of mirrors embodying a composite of two partially transparent reflective layers in which the separate layers are altered in thickness in compensating manners would indicate that the same wave lengths of light were altered by interference brought about by the retarding rays and that the spectral curve for each mirror would show a minima at the same general wave length position. The ability of two substances to alternatively compensate for each other as their thicknesses are changed in a composite of two partially transparent thin layers is naturally restricted in the one sense insofar as selective absorption effects peculiar to the one or the other substance also come into play. Successive series of mirrors may be produced which traverse the entire spectral range and it is found that mirrors going through the spectral range of colors in several successive series may be formed as the thickness of one or the other of our semi-transparent thin films in a composite is continuously increased.

In view of the many complex paths as shown in Figure 7 in which the light rays may be directed within our multiple layered mirrors and of the considerable amount of and number of multiple internal reflections possible in the very thin highly or partially transparent layers it would appear that while the summation of the retardations of the light rays in the individual layers might be calculated by the well known vectorial method applied to such multiple layers it is apparent that due to the numerous multiple reflections occurring that the sums would not only indicate the cooperative films as acting similar to single films of $$\frac{\lambda}{4N}$$

thickness or some multiple of this as 3, 5, 7 but that interference color effects were secured in our mirrors at numerous thicknesses, such calculated totalized thicknesses as are submultiples of this such as $$\frac{\lambda}{4NR}$$

and multiples of these figures by odd integers 1, 3, 5, 7 and so forth. In the examples which follow many cases appear where R appears to be of value 2, 4 and 8. However, as the phenomena in the mirrors as made under this invention are highly complex and further complicated by absorption effects we do not feel that such values as may so be calculated are limiting.

The mirrors produced in the manner of this invention and in the examples which follow will have a desired color and reflectivity value and the color indicated in each example will be the color of the mirror when viewing it directly at perpendicular or normal incidence. When viewing the mirror at different angles, the shade of the color will vary.

The nature of our new mirrors and their means of formation will be apparent from the following examples.

EXAMPLES 1 TO 16

In preparing the mirrors of these examples as shown in Table I a single thin semi-transparent reflective film of lead sulfide is deposited by special chemical means, this film being of different thickness in each example and, in turn, in each case being backed with an opaque black paint layer. Each of the mirrors is of different color and spectral and total light reflective characteristics as shown and as appears in the respective spectral reflection curves given in Figures 12 and 13.

Ordinary plate glass is thoroughly cleaned, scrubbed with rouge and then rinsed thoroughly several times. The wet glass is then ready for mirroring. The mirroring is carried out at 68 degrees Fahrenheit and the solutions, glass and machines are all brought to this temperature by doing all the work in a constant temperature room regulated to this condition. This gives uniform conditions and with the mirroring solution used, the deposition proceeds at a constant rate so that the thickness of deposit is determined by the time the solution is permitted to act. Three aqueous solutions are made up for use as follows: Solution A, which contains 3.18% of sodium hydroxide and 0.00054% of sodium potassium tartrate. Solution B, which contains 3.7% of lead acetate and 0.264% of acetic acid. Solution C, which contains 2.64% of thiourea. These three solutions are mixed together in equal quantities just prior to their being poured onto the glass. The mixed solution at the time of pouring is of the following composition:

1.06% sodium hydroxide
1.23% lead acetate
0.88% thiourea
0.088% acetic acid
0.00018% sodium potassium tartrate As compared with the method of forming lead sulfide mirrors shown in the patent to Colbert et al., 1,662,564, of March 13, 1928, it is seen that we use a higher concentration of lead acetate and a lower concentration of thiourea. These changes have the effects of increasing to some degree the laying down of the nuclei uniformly and of slowing down the rate of reaction. These effects are also enhanced by the use of a temperature of 68 degrees Fahrenheit in contrast to the 95 degrees or higher ordinarily employed in depositing lead sulfide mirrors. However, these changes alone have been found to be insufficient as it generally occurs, when mirror deposition is slowed down, that the securing of uniform deposits becomes more difficult. As it is particularly necessary that the thin mirror films be extremely uniform because of their consequent variation in color, if not, and also because of their semi-transparent nature, we have found it necessary to add a new substance having a retarding effect on the deposition rate and one which facilitates very uniform deposition. This substance is preferably sodium potassium tartrate. It is believed that the sodium potassium tartrate, which is used in very small amounts as it has a substantial effect, operates by possibly decreasing greatly the rate of growth of lead sulfide on already deposited nuclei. Thus, greater numbers of nuclei are apparently caused to form and the growth on these nuclei becomes slow and uniform in every direction. While the deposition rate of the formula of Patent 1,662,564 can be decelerated by working even below 68 degrees Fahrenheit or by using less alkali, neither of these procedures will give satisfactory uniformity for the making of good interference colored mirrors. The use of the small amount of sodium potassium tartrate is thus very desirable, although we have found that other materials may be used as retarders, as indicated in our said co-pending application.

In order to overcome the limiting of the amount of solution in contact with the glass at its edge by surface tension effects and the variation in deposit thickness at the edges, as a consequence, we find it preferable, in order to secure very uniform results, to place the wet glass to be mirrored in a stainless steel pan, precoated with lead sulfide, and to rock the pan about 35 times a minute using a metal frame insert in the bottom of the pan to keep the glass from shifting. Approximately 2.8 cc. of mixed solution per square inch of glass to be treated is poured over the glass in the tray and the rocking keeps this liquid uniformly flowing over the surface of the glass during the entire deposition.

With our new mixed solution, after about 8.5 minutes from the time of pouring, a darkening of the glass can first be noticed and the thickness of mirror film becomes progressively greater as the time increases. If the deposition is allowed to proceed for about 60 minutes, a completely opaque ordinary type lead sulfide mirror is secured, in which the thickness of coating is about 0.140 micron. Mirrors of this thickness with lead sulfide are usually laid down in about 7 minutes, using the solution of Patent No. 1,662,564, and these mirrors show no color, as indicated by the spectral reflection curve of Figure 1, and are opaque. For the spectral reflectivity curve shown, the total reflectivity is 29%.

By adding a large amount of water to the pans at the times indicated in the following table, the semi-transparent reflective deposits of lead sulfide were made. Diluting the chemical solution with the large amount of water stopped the deposition reaction at the times indicated.

Table

| Example No. | Time of Forming, Minutes | Color | Total Per Cent Reflectivity | Total Per Cent Transmission | Spectral Minimum | Film Thickness, Microns | Wave Factors | No. of Times Ray Reflected |
|---|---|---|---|---|---|---|---|---|
| 1 | 12.3 | Bluish Gray | 33.8 | 45 | 7,500 | .024 | $\frac{\lambda}{8N}$ | 2 |
| 2 | 13.3 | Pale Yellow | 35.7 | 42 | 4,000 | .026 | $\frac{\lambda}{4N}$ | 1 |
| 3 | 14.2 | Bright Yellow | 34.4 | 40 | 4,400 | .028 | $\frac{\lambda}{4N}$ | 1 |
| 4 | 15.2 | Orange Yellow | 31.7 | 37 | 4,700 | .030 | $\frac{\lambda}{4N}$ | 1 |
| 5 | 16.1 | Red Yellow | 28.2 | 35 | 4,950 | .032 | $\frac{\lambda}{4N}$ | 1 |
| 6 | 17.7 | Purple Red | 24.9 | 33 | 5,250 | .034 | $\frac{\lambda}{4N}$ | 1 |
| 7 | 18 | Red Purple (Mauve) | 21.6 | 30 | 5,500 | .036 | $\frac{\lambda}{4N}$ | 1 |
| 8 | 19.4 | Purple | 21.2 | 28 | 5,900 | .038 | $\frac{\lambda}{4N}$ | 1 |
| 9 | 20.6 | Purple Blue | 20.9 | 26 | 6,300 | .040 | $\frac{\lambda}{4N}$ | 1 |
| 10 | 22.6 | Clear Blue | 19.8 | 23 | 6,850 | .044 | $\frac{\lambda}{4N}$ | 1 |
| 11 | 23.3 | Blue Green | 20.0 | 21 | 7,300 | .046 | $\frac{\lambda}{4N}$ | 1 |
|  |  |  |  |  | 4,600 | .046 | $\frac{5\lambda}{16N}$ | 1 |
| 12 | 24 | Grayish Pale Yellow | 21.8 | 19 | 4,800 | .047 | $\frac{5\lambda}{16N}$ | 1 |
| 13 | 24.4 | Grayish Yellow | 23.2 | 18 | 4,950 | .048 | $\frac{5\lambda}{16N}$ | 1 |
| 14 | 25.6 | Grayish Red | 24.8 | 17 | 5,200 | .050 | $\frac{5\lambda}{16N}$ | 1 |
|  |  |  |  |  | 7,200 | .050 | $\frac{3\lambda}{8N}$ | 2 |
| 15 | 28.5 | Grayish Purple | 24.8 | 16 | 5,800 | .056 | $\frac{5\lambda}{16N}$ | 1 |
| 16 | 33.2 | Silvery Blue | 21.8 | 12 | 6,700 | .065 | $\frac{5\lambda}{16N}$ | 1 |

The lead sulfide coated glasses were made into mirrors by painting the lead sulfide surface with an opaque black material such as lacquer which was then dried.

In the table, each of the mirrors thus produced is a compound colored mirror made with a single thin semi-transparent lead sulfide reflecting film of increasing thickness, going from Example 1 through Example 16, which film causes light interference effects, and an opaque backing layer. This table shows the color of the mirrors, thus produced, and their total reflectivity value. Each of the mirrors was perfectly uniform in color and a good reflector.

Figure 13:
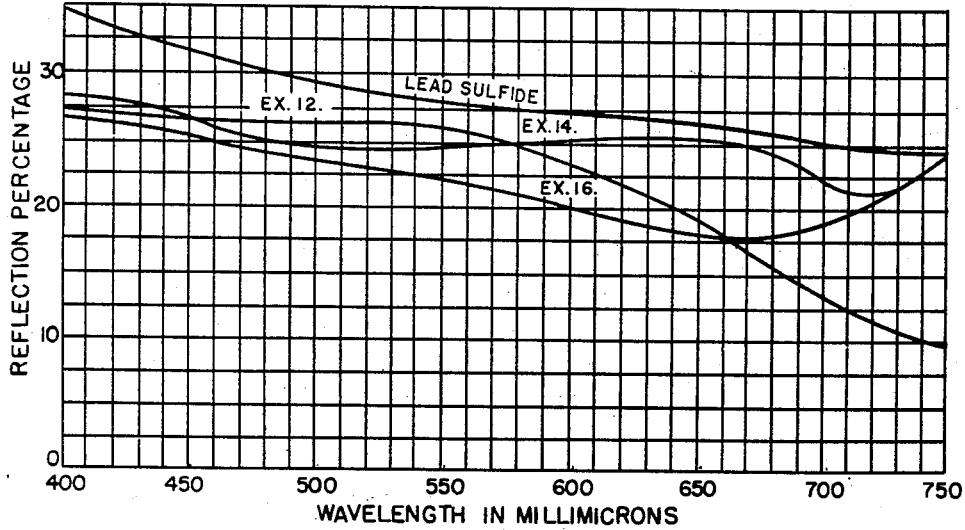
Figure 13 is a similar view of spectral curves of mirrors in each case with a single semi-transparent lead sulfide film of a greater thickness than those of Figure 12 and an opaque backing of black lacquer.

The spectral reflectivity curves Figures 12 and 13 for these compound mirrors each shows a dip in the curve or minima. By comparison, the spectral reflectivity curve for an ordinary opaque film lead sulfide mirror, as shown in Figure 1, is free of any dip or indication of color. The minima in the spectral reflectivity curves shows the light rays which are being diminished in the reflected light by interference. As would be expected for interference effects, the minima continually shift in the examples toward the longer red rays, as the film thickness of the semi-transparent lead sulfide layer, in the examples, is increased. The wave length at which the minima appear in the spectral reflection curves for the various samples, in the table, are shown as well as the thickness of the lead sulfide layer.

In order to more clearly bring out the nature of the color and reflective characteristics of our new compound mirrors the spectral reflectivity curves in Figures 12 and 13 are given.

The mirrors of Examples 1 and 16 may be used in furniture, in store decoration, and in a wide variety of decorative and reflector uses.

EXAMPLE 17

If in preparing the semi-transparent lead sulfide reflective coating for Example 1, we arrange to blow a fine gentle current of air on the top of the glass plate, while it is in the pan being coated with the lead sulfide, and do so at several points, the resulting mirror produced when backed with an opaque non specular reflective coating will not be of one uniform color throughout but will show a variegated pattern in various colors. This is due to the fact that the film thickness of the deposited lead sulfide at various points on the glass will vary. Such a coating may obviously be employed as one of the layers in the composite film means such as the lead sulfide film disclosed in Example 26, below.

EXAMPLE 18

Two cleaned pieces of glass were mounted within a chamber and, in the high vacuum created therein, there was deposited by thermal evaporation upon the glass a thin transparent layer of copper of a thickness of .030 micron. Upon this continuous thin layer, which had a transparency of 20% and a reflectivity of 27%, there was next deposited by thermal evaporation a layer of magnesium fluoride of .070 micron thickness. Thereafter the mirror was completed by coating one piece of the glass on the magnesium fluoride with an opaque backing of black paint.

The second surface mirror thus employs a composite film element of copper and magnesium fluoride and a backing of opaque black paint. The mirror produced showed a visually effective red yellow red color and clear reflected images of high brilliancy. The total reflectivity of the mirror was 50%. The colors of the mirror are expressed according to the Munsell color system in these examples and generally in the further examples of this invention. The calculated thicknesses of the separate partially transparent layers in terms of fractional quarter wave lengths as calculated by using the refractive index of the individual layers for the wave length 4800 which is the minima in the spectral reflection.

Curve C21 of Figure 18 was 0.80 times a quarter wave length for the copper and 0.80 times a quarter wave length for the magnesium fluoride layer.

The second piece of glass carrying the same two coatings was coated upon the magnesium fluoride with an opaque specular reflective backing of aluminum. The spectral curve C22 of Figure 18 shows this mirror to be quite different from the mirror prepared above. Its total reflectivity was 55% and its color was yellow red to red yellow red. The spectral curves C21 and C22 show the latter aluminum backed mirror has more blue removed by interference and more red reflected than occurs with the black paint backed mirror.

EXAMPLE 19

A white paint upon glass carrying the same copper and magnesium fluoride layers gave a lighter shade mirror and yellower color as compared with the black paint backed mirror.

EXAMPLE 20

A mirror was prepared in the same manner as in Example 18 using the same continuous thin semi-transparent films of copper and magnesium fluoride except that they were applied to the glass in reverse order, that is, the magnesium fluoride first and then the copper. The copper face was then backed with an opaque layer of black paint giving a second surface mirror of 52% total reflectivity and of a yellow red to yellow red yellow color. As can be seen from a comparison of its spectral curve C23 of Figure 18 with the spectral curve C21 of Figure 18 of the similar mirror prepared in Example 18 but with the two semi-transparent layers applied in reverse order, the colors are quite different being, in this example, considerably lower in blue and red and consequently appearing more yellow.

EXAMPLE 21

A thin continuous layer of aluminum of .0155 micron thickness was deposited upon two clean glass plates in a vacuum by thermal evaporation. The coating showed a transparency of 50% and a reflectivity of 8% and showed no particular color. Thereafter within a vacuum a thin transparent continuous uniform layer of silica .082 micron in thickness was deposited upon the aluminum. Black paint was then applied on top of the silica in one case. The second coated glass was coated upon the silica with an opaque specular reflective silver backing by thermal evaporation. The color of the mirror backed by the black paint was brown black and of 8% total reflectivity. The spectral reflection curve for this mirror is shown at C15 in Figure 15. The color of the silver backed mirror was yellow and the total reflectivity was 73% and its spectral reflection curve is shown at C18 in Figure 18. It is apparent that the nature of the backing led to entirely different mirrors in the two cases where the composite partially transparent reflective elements were the same. The minima in the black paint backed mirror is at 5800 and the thickness of the aluminum film in quarter wave length factors at such minima calculates as 0.155 and the silica thickness as 0.82 quarter wave length factors.

EXAMPLE 22

Two mirrors were prepared on glass in exactly the same manner as in Example 21 and using the same partially transparent continuous layers of aluminum and silica in the same thicknesses except applied in reverse order, that is, the silica layer first on the glass and then the aluminum. The backings, applied to the aluminum layer in this example, were again black paint in one case and specular silver in the other. The first mirror was purple black in color and of 9% total reflectivity. The second was yellow in color and of 45% total reflectivity. A comparison of the spectral reflection curves C19 (Figure 15) for the black paint backed mirror, and C20 (Figure 18) for the silver backed mirror, clearly shows the difference in the two mirrors.

A comparison of the spectral curve C15 of the black paint backed mirror of Example 21 with the curve C19 the spectral curve of the black paint backed mirror of this example shows the difference in color obtained when the thin transparent aluminum and silica films are reversed with respect to the glass support and the black paint backing.

EXAMPLES 23, 24 AND 25

Colored mirrors produced by using a complex composite of partially transparent laminae cooperatively acting to produce light interference effects backed up by a non-specular reflective black paint. In producing these mirrors there was first deposited on a piece of glass by thermal evaporation in a vacuum a continuous uniform layer of copper of .0054 micron thickness and next, in a similar manner, a continuous uniform film of silica .037 micron thick. On another piece of glass this deposition cycle of .0054 micron thick copper and .037 micron thick silica was repeated twice. On still another piece of glass the cycle was repeated three times. These three coated glasses were then coated on their silica faces with opaque black paint. As can be seen from their spectral reflection curves C24, C25, and C26 (Figure 15) for the black paint backed single, double, and triple dual semi-transparent layers respectively, these three mirrors are all of different color and reflectivities being blue black, red purple, and green black respectively and of 8%, 5% and 6% total reflectivities respectively. As calculated from the spectral minima appearing on the spectral reflection curve C24 (Figure 15) and from the refractive index of the individual semi-transparent layers, the thickness of the copper and silica layers in terms of quarter wave length factors are .030 and .38 respectively.

EXAMPLE 26

A cleaned piece of transparent glass was coated on one side by chemically depositing lead sulfide as in Example 2. This partially transparent coated glass was then introduced into a high vacuum and a thin transparent layer of silica was evaporated on top of the lead sulfide. To the coated piece there was then applied a coating of black paint upon the uncoated glass surface. This gave a colored mirror giving clear reflected images in which the composite element of the plurality of partially transparent layers was on the front side of the mirror support and the opaque backing was on the back side of the mirror support.

EXAMPLES 27, 28 AND 29

A first surface mirror was made by thermally evaporating, upon an opaque polished black glass support, a layer of thin partially transparent zinc sulfide and then upon this a partially transparent thin layer of silica. This gave a colored mirror in which the latter two layers gave interference colors and reflectivity and in which the black backing further modified the action of the mirror. Good specular image formation of the mirror was apparent.

The black glass support acted as the opaque backing in a manner similar to the opaque coatings otherwise described heretofore.

During the preparation of the above mirror a plastic Bakelite button of a dark brown color which was opaque was also placed in the vacuum chamber and upon its surface the same deposits were applied. This gave a finished button with a highly reflective surface, the reflection from which was highly colored.

As a further colored article with mirror reflective surfaces a tumbler was prepared with the same coatings on its exterior wall. The tumbler which had vertical side walls was placed in the same vacuum at the time of forming the above deposits and the tumbler was rotated continuously during the deposition of the zinc sulfide and silica layers. The tumbler was then finished by applying an opaque black paint coating upon its interior surfaces.

EXAMPLES 30 AND 31

As an example of a colored mirror made by light interference effects using a composite laminae comprising only metals as the component elements, there was first deposited on a piece of glass by thermal evaporation in a vacuum, a thin transparent continuous layer of copper of .011 micron thickness, and next a thin transparent continuous layer of aluminum of .010 micron thickness. This mirror was backed by a substantially opaque layer of black paint. The completed mirror had a total reflectivity of 38%. The mirror showed distinct colored images, and the mirror was yellow red yellow in color.

EXAMPLES 32 AND 33

Another mirror was made in exactly the same manner as the one in the preceding example and using the same thickness layers but differing from the mirror in the preceding example in that the thin continuous light interference component elements of the composite laminae were deposited in reverse order, that is, the aluminum film first and then the copper. This gave a mirror which was of the same general color tone as those in the preceding example but of lower total reflectivity. The mirror in this case had a total reflectivity of 25% and was brown gray in color. Likewise, this mirror formed excellent colored images.

In our colored mirrors the total thickness of the composite element comprising the contacting partially transparent interference layers with the adjacent layers having continuously contacting interfaces can be greater than $$\frac{9\lambda}{4N}$$

but it is necessary that each separate layer be not greater than $$\frac{9\lambda}{4N}$$

Also our mirrors have a reflectivity greater than that of the support and preferably greater than 10% in visible light.

It will be apparent from the above description that we have provided colored mirrors or other mirror reflective articles of a wide range of color characteristics and of a wide range of reflectivity percentage characteristics which can be controlled as desired. The color values in the reflective mirror films are secured primarily by the light interference effects but are modified by the selective light transmission and absorption and the reflective character of our semi-transparent layers and further modified by the nature of the substantially opaque backing layer. As the colors are thus produced by physical effects, they are permanent and non-fading and the colored mirrors produced are inexpensive.

Various other advantages will be apparent from the preceding description and the following claims.

What we claim as our invention is:

1. A colored article having mirror specular light reflective surfaces having an effective reflectivity to produce an adequate clear reflected image and also producing visually effective color comprising support means, composite, partially transparent, continuous light interference reflective color producing film means inherently producing color by interference between light rays reflected forwardly from said film means, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness of not more than nine times the quarter wave length factor $$\frac{\lambda}{4N}$$

where $\lambda$ represents a wave length of visible light and $N$ represents the refractive index of said layer, and substantially opaque means behind said film means, all of said means being superimposed in fixed relation to each other with adjacent means having their interfaces in intimate optical contact, one of said substantially opaque and film means being on a surface of said support means, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article to thereby produce an article having the desired color effect.

2. A colored article having mirror specular light reflective surfaces having an effective reflectivity to produce an adequate clear reflected image and also producing visually effective color comprising support means, composite, partially transparent, continuous light interference reflective color producing film means inherently producing color by interference between light rays reflected forwardly from said film means, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness of not more than nine times the quarter wave length factor $$\frac{\lambda}{4N}$$

where $\lambda$ represents a wave length of visible light and $N$ represents the refractive index of said layer, and substantially opaque non-specular light reflective means behind said film means, all of said means being superimposed in fixed relation to each other with adjacent means having their interfaces in intimate optical contact, one of said substantially opaque and film means being on a surface of said support means, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article to thereby produce an article having the desired color effect.

3. A colored article having mirror specular light reflective surfaces having an effective reflectivity to produce an adequate clear reflected image and also producing visually effective color comprising support means, composite, partially transparent, continuous light interference reflective color producing film means inherently producing color by interference between light rays reflected forwardly from said film means, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness between .004 and nine times the quarter wave length factor $$\frac{\lambda}{4N}$$

inclusive where $\lambda$ represents a wave length of visible light and $N$ represents the refractive index of said layer, and substantially opaque means behind said film means, all of said means being superimposed in fixed relation to each other with adjacent means having their interfaces in intimate optical contact, one of said substantially opaque and film means being on a surface of said support means, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article to thereby produce an article having the desired color effect.

4. A colored article having mirror specular light reflective surfaces having an effective reflectivity to produce an adequate clear reflected image and also producing visually effective color comprising support means, composite, partially transparent, continuous light interference reflective color producing film means inherently producing color by interference between light rays reflected forwardly from said film means, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness between .01 and 2.5 times the quarter wave length factor $$\frac{\lambda}{4N}$$

inclusive where $\lambda$ represents a wave length of visible light and N represents the refractive index of said layer, and substantially opaque means behind said film means, all of said means being superimposed in fixed relation to each other with adjacent means having their interfaces in intimate optical contact, one of said substantially opaque and film means being on a surface of said support means, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article to thereby produce an article having the desired color effect.

5. An article as defined in claim 1 in which said layers are of uniform thickness.

6. An article as defined in claim 1 in which at least one of said layers has portions of different thickness.

7. An article as defined in claim 1 in which the article is a second surface mirror, said support means is transparent and in which said film means is on the back surface of said support means and said opaque means is on the back surface of said film means.

8. An article as defined in claim 1 in which the article is a first surface mirror, said opaque means is on the front face of said support means and said film means is on the front face of said opaque means.

9. An article as defined in claim 1 in which said opaque means is effective to absorb at least one color transmitted by said film means.

10. An article as defined in claim 1 in which said layers are formed of inorganic material.

11. An article as defined in claim 1 in which said reflective means is an inorganic compound.

12. An article as defined in claim 1 in which said reflective means is metal.

13. A colored article having mirror specular light reflective surface portions having an effective reflectivity to produce an adequate clear reflected image and exhibiting different visually effective color effects as a result of light ray interference, comprising support means in the form of a shaped body having a surface formed with portions angularly disposed with respect to each other, composite, partially transparent, continuous light interference reflective color producing film means inherently producing color by interference, said film means comprising a plurality of continuous partially transparent layers having smooth surfaces, each of said layers having an index of refraction sufficiently different from the index of refraction of the contiguous layer to bring about reflection of light at the interfaces, said layers being superimposed in fixed relation and having their interfaces in intimate contact, each of said layers having a thickness of not more than nine times the quarter wave length factor $$\frac{\lambda}{4N}$$

where $\lambda$ represents a wave length of visible light and N represents the refractive index of said layer, and substantially opaque means behind said film means, all of said means being superimposed in fixed relation to each other with adjacent means having their interfaces in intimate optical contact, one of said substantially opaque and film means being on a surface portion of said shaped body, the said means immediately back of said film means having a smooth surface in intimate contact with said film means and being of a refractive index sufficiently different from that of the adjacent layer of said film means to bring about reflection of light back through said film means, the thickness of said film layers and the differences in the refractive indices being so correlated that part of certain of the spectral waves of the visible spectrum is removed by light interference from the light reflected from the colored article, said composite film means covering at least one of said portions which covered portions are sufficiently smooth to produce specular reflection, the angularly disposed portions of the surface of the article being so disposed with respect to a single point of observation that light rays incident upon said body and reflected at the rear surface of said film means to said single point of observation are caused to traverse said film means along paths of different lengths to produce different visually effective colors at different areas of said body by light interference with light reflected from the film means forwardly of the rear surface thereof, which colors vary substantially in accordance with changes in angularity of said areas with respect to said single point of observation.

14. An article as defined in claim 13 in which the article is a glass tumbler having inner and outer surfaces and said film means is applied to one of said surfaces.

15. An article as defined in claim 14 in which the film means is applied to the outer surface of said tumbler and the opaque means is applied to the inner surface of said tumbler.

16. An article as defined in claim 13, in which the article is an opaque button.

WILLIAM H. COLBERT.
WILLARD L. MORGAN.

(References on following page)

REFERENCES CITED

The following references are of record in the file of this patent:

UNITED STATES PATENTS

| Number | Name | Date |
|---|---|---|
| 2,392,978 | Dimmick | Jan. 15, 1946 |
| 2,403,685 | Sachtleben et al. | July 9, 1946 |

OTHER REFERENCES

Physical Optics (Text), R. W. Wood (1936); publ. by The MacMillan Co. New York, New York; pages 198 and 199.

Edwards: "Interference in Thin Metallic Films," Physical Review, July 1, 1931 (vol. 38), pages 166 to 173.

Cartwright et al.: (Pub.) "Multi-Layer Films of High Reflecting Power," American Physical Society, volume 14, No. 2, Apr. 1939, page 24.